(No Model.)

J. F. LUKENS.
AUTOMATIC GATE ATTACHMENT.

No. 257,956. Patented May 16, 1882.

Witnesses.
H. M. S. Oswald
P. W. Keller.

Inventor.
Jno. F. Lukens

UNITED STATES PATENT OFFICE.

JOHN F. LUKENS, OF WEST MANSFIELD, OHIO.

AUTOMATIC GATE ATTACHMENT.

SPECIFICATION forming part of Letters Patent No. 257,956, dated May 16, 1882.

Application filed November 14, 1881. (No model.)

*To all whom it may concern:*

Be it known that I, JOHN F. LUKENS, a citizen of the United States, residing near West Mansfield, in the county of Logan and State of Ohio, have invented a new and useful Improvement in Automatic Gate Attachments, of which the following is a specification.

My invention consists in a novel, cheap, and practicable attachment to the ordinary farm-gate, whereby with a lower hinge of any suitable sort the ordinary strap-hinge is used above, being opened and bent around the double crank, which is attached to the post at points above and below the double crank. A lever-arm extends above the double crank, which is operated from a distance by cords or wires.

Figure 2:
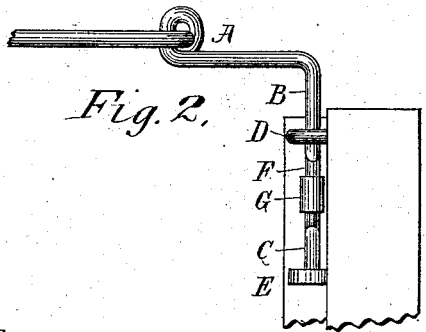
Figure 1:
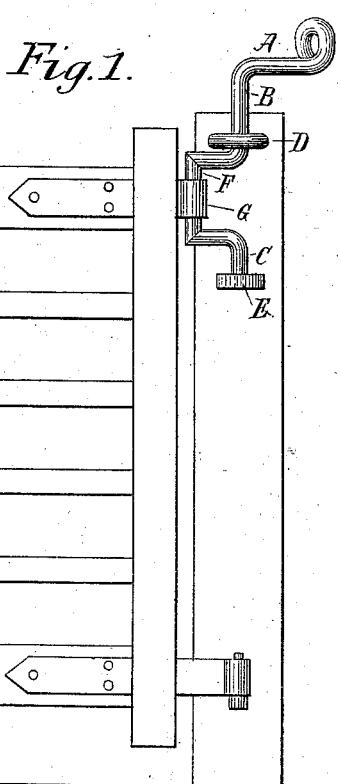
Figure 3:
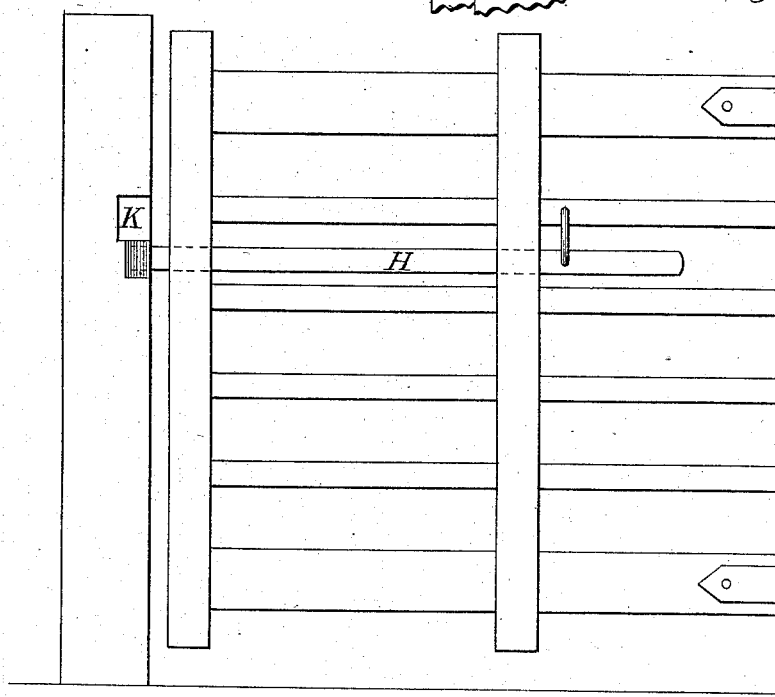
Figure 3:
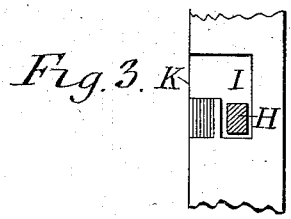

Figure 1 is an elevation of the gate. Fig. 2 is a detail view of the hinge, and Fig. 3 is a detail of the latch-post.

A is the crank-handle to which the ordinary wires of automatic gates are attached; B C, the bearings on the crank which fit into eyes D and E in gate-post; F, bearing on the crank which fits into eye G of the ordinary gate-hinge. D is an eye or seat for the lower end of crank to work and sit in, and is formed on the end of an iron piece which screws or is driven into the post. E is a hook, the long end of which passes through the post, and may be secured by a nut, while the bend and short end act as a bearing for the upper end of crank.

In attaching my invention to a gate I open the strap-hinge and pass the crank through till bearing F rests therein. The bottom of the crank is then placed in eye D and the eye E clasped around the upper bearing of the crank. The wires used in the ordinary automatic gate are then attached to handle A of the crank, and the gate is transformed into a regular automatic gate, posts with levers to attach the wires to having been placed in proper positions.

I also have a latch, H, and latch-opening I, peculiarly well adapted for automatic gates. The latch is swung by a wire near its rear end, so that when the beveled end of the latch strikes the gate-post, as the gate swings shut the latch swings backward until opposite the vertical slot in the gate-post, when the end of the latch swings into the slot and secures the gate shut. The vertical slot has a lateral opening, K, near the top, which allows the latch to pass out unobstructed when the gate is raised and thrown out of plumb by the operation of the crank.

In arranging the bearings for my crank attachment it will be observed that I do not place them directly over the lower hinge, but some little bit to one side of a perpendicular line with it, so that the movement of the crank throws the gate out of perpendicular and causes it to swing as desired.

I disclaim broadly the idea of using the crank as the method of swinging the gate.

What I claim as my invention is—

The combination, with a gate having a lower hinge of any suitable kind, of an upper hinge consisting of a hinge-strap, and of a rod bent to form a double crank and a lever-arm, the crank passing through the hinge-strap and attached to the hinge-post above and below the double crank, while the lever-arm is extended above the post and provided with pulley cords or wires, whereby the gate may be opened and closed from a distance, substantially as described.

JNO. F. LUKENS.

Witnesses:
J. W. SHUFFELTON,
HAL E. KNIGHT.